(12) United States Patent
Chaugule et al.

(10) Patent No.: US 11,924,916 B2
(45) Date of Patent: Mar. 5, 2024

(54) INTEGRATED STANDALONE FLOW FOR CELLULAR SUBSCRIPTION TRANSFER

(71) Applicant: Apple Inc., Cupertino, CA (US)

(72) Inventors: Raj S. Chaugule, Santa Clara, CA (US); Alex M. Was, Cupertino, CA (US); Avinash Narasimhan, San Francisco, CA (US); Damien R. Holzapfel, Campbell, CA (US); He Zheng, Irvine, CA (US); Li Li, Saratoga, CA (US); Timothy M. Sheridan, Cedar Park, TX (US); Vikram B. Yerrabommanahalli, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 17/555,205

(22) Filed: Dec. 17, 2021

(65) Prior Publication Data
US 2023/0199471 A1    Jun. 22, 2023

(51) Int. Cl.
*H04W 12/03* (2021.01)
*H04W 8/18* (2009.01)
*H04W 12/033* (2021.01)
*H04W 12/30* (2021.01)

(52) U.S. Cl.
CPC .......... *H04W 8/18* (2013.01); *H04W 12/033* (2021.01); *H04W 12/35* (2021.01)

(58) Field of Classification Search
CPC ................. H04W 8/18; H04W 12/30
See application file for complete search history.

(56) References Cited

U.S. PATENT DOCUMENTS

2020/0169870 A1\*  5/2020  Lucas ............... H04W 8/265
2020/0260241 A1\*  8/2020  Sicard .............. H04W 8/245
2021/0377722 A1\* 12/2021  Fan ................. H04W 8/205

\* cited by examiner

*Primary Examiner* — Michael T Vu
(74) *Attorney, Agent, or Firm* — Brownstein Hyatt Farber Schreck, LLP

(57) ABSTRACT

A user equipment (UE) is configured to transmit, to a cellular carrier, a request to activate the UE with the cellular carrier. The UE is also configured to, in response to receiving an authentication request for authenticating a user of the UE, transmit, to the cellular carrier, information identifying another UE and authentication information for authenticating the user ; prompt the user, via a display of the UE, to provide, to an input system of the UE, verification information transmitted to the other UE; transmit, to the cellular carrier, the verification information; and in response to validation of the verification information by the cellular carrier, receive an embedded subscriber identity module (eSIM) subscription transferred from the other UE.

20 Claims, 9 Drawing Sheets

INTEGRATED STANDALONE FLOW FOR
CELLULAR SUBSCRIPTION TRANSFER

TECHNICAL FIELD

Embodiments described herein generally relate to activating a new user equipment (UE) with a cellular carrier and transferring a set of services offered by the cellular carrier from an old UE to the new UE.

BACKGROUND

A user of a UE such as a phone, a smart phone, a tablet, a smartwatch, and so on, may have a subscription plan with a cellular carrier. The subscription plan may enable the user to receive a set of subscription services from the cellular carrier. An example of a subscription service is a service for receiving an incoming call and/or making an outgoing call using a cellular network of the cellular carrier. When the user wants to upgrade and/or replace the UE, the set of subscription services may be transferred to a new UE.

When a user visits a store (a physical store or an online store) to purchase a new UE, via a point-of-sale (POS) system of the store, the user is required to be pre-authenticated on a cellular carrier portal before the purchase of the new UE can be completed. Pre-authenticating the user can take a substantial amount of time, and can take a substantial amount of time for both the user and a sales representative when the user makes the purchase at a physical store. As a result, the user and/or the sales representative may grow impatient. Regardless of whether the user visits an online store or a physical store, but particularly when the user visits an online store, the user may become impatient with the pre-authentication process and decide to purchase a new UE at a later time or not at all.

After the new UE is sold to the user, and upon successful pre-authentication of the user with the cellular carrier during the UE's purchase, the user needs to be authenticated with the cellular carrier again to activate and transfer subscription services from an old UE of the user to the new UE. The additional authentication is performed using authentication information that includes personal or private information of the user. The authentication information is sent to the cellular carrier unencrypted, which may pose a security risk.

BRIEF DESCRIPTION OF THE DRAWINGS

Reference will now be made to representative embodiments/aspects illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

DETAILED DESCRIPTION

Figure 1:
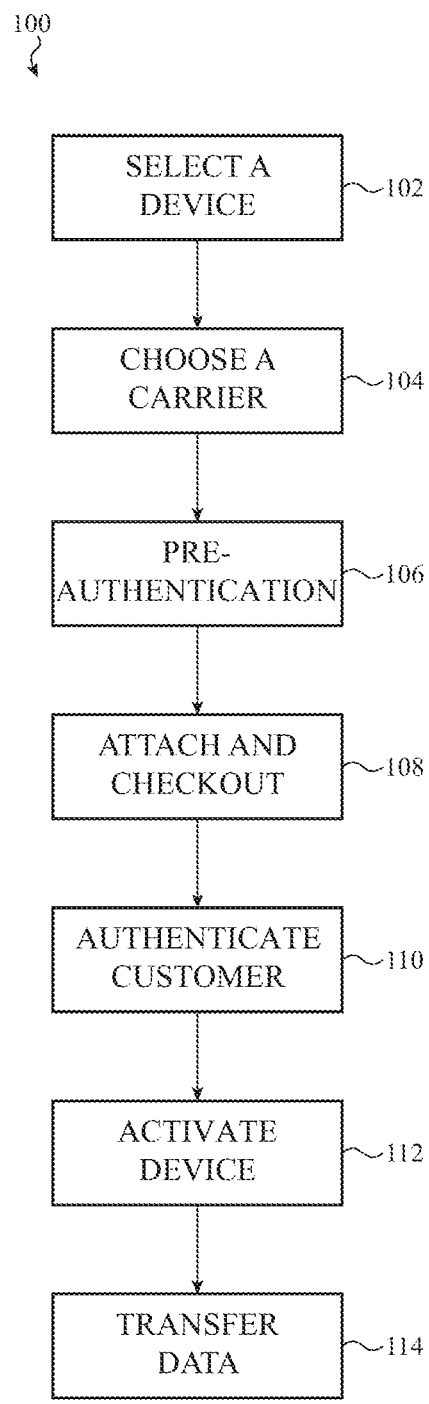
FIG. 1 depicts an example flow for selling and activating a UE.

Reference will now be made in detail to representative embodiments/aspects illustrated in the accompanying drawings. It should be understood that the following description is not intended to limit the embodiments to one preferred embodiment. On the contrary, it is intended to cover alternatives, modifications, and equivalents as can be included within the spirit and scope of the described embodiments as defined by the appended claims.

Embodiments described herein include methods, systems, and an apparatus (a UE) for selling a UE to a user and later activating the UE to receive a set of services ("subscription services") from a cellular carrier at the UE. The set of services may be transferred from another UE that is owned or used by a user of the new UE. An embedded subscriber identity module (eSIM) subscription may be transferred from the other UE to the new UE.

As described herein, a UE may be a phone, a smart phone, a tablet, a smartwatch, and so on, and may have a subscription plan with a cellular carrier to receive a set of one or more subscription services. When a user wants to upgrade and/or replace a UE that the user is currently using, the set of subscription services may be transferred to a new UE as described herein.

Conventionally, when a user visits a store (a physical store or an online store) to purchase a new UE, via a POS system of the store, the user is required to be pre-authenticated on a cellular carrier portal before the purchase of the new UE can be completed. Pre-authenticating the user can take a substantial amount of time.

In some of the embodiments described herein, no pre-authentication of the user is required at the POS system when a user is purchasing a new UE. However, information, including order information related to the new UE and its sale to the user, may be transmitted to the cellular carrier or a proxy therefor (e.g., a UE manufacturer or UE seller). Particularly, the order information may be transmitted to a set of one or more servers. The set of one or more servers may be implemented using hardware or a virtual machine.

In some embodiments, the transmission of order information from the POS system to the set of one or more servers may be referred as setting a tether action or parking an order. The order information may include a number of fields, such as fields for a phone number, an integrated circuit card identifier (ICCID) of the UE being sold the user, an ICCID of another UE of the user (e.g., a source ICCID), a setup type or a device activation mode, a setup uniform resource locator (URL), an encryption mode, and so on. By way of a non-limiting example, the set of one or more servers to which order information from the POS system is transmitted or a tether action setting is performed may be one or more servers in a UE manufacture's network and/or a POS system, or could alternatively be one or more servers in a cellular carrier domain.

In some embodiments, no value may be set for one or more of the fields in the order information (e.g., for the source ICCID). For example, in some cases, the setup type or the device activation mode may be set to standalone online device activation ("SODA"), and the encryption mode may be set to "true" or "on" to indicate that at least some information transmitted by the UE may be encrypted and may require functions and/or services associated with encryption and/or decryption of information. SODA, as defined herein, refers to an activation of a UE, with a cellular carrier, performed outside of a buy flow in which the UE is purchased. A SODA activation may be performed without any sort of pre-authentication of the user with the cellular carrier at the point of sale.

In some embodiments, the setup URL may be an endpoint, which endpoint may be contacted by the new UE upon powering on for activation of the new UE, and for transferring an eSIM subscription from an old UE of the user to the new UE. By way of example, the setup URL may include a list of one or more endpoints. The one or more endpoints may be one end of a communication channel, particularly on the UE manufacturer or cellular carrier domain side, providing one or more services related to an activation of the new UE. The setup URL may be valid for a limited time period. Accordingly, in some cases, an expiration time for the setup URL may be included in the order information. In some cases, the expiration time may be set to, for example, a few hours to a few days. By way of a non-limiting example, the one or more endpoints contacted by the new UE upon powering on may be referred as one or more device services endpoints. The one or more endpoints represented by the setup URL may also be valid for a limited time period. The setup URL may be configured and/or stored in a memory of the new UE In some embodiments, the one or more fields of the number of fields included in the order information may be set by the POS system and/or the set of one or more servers in the cellular carrier domain. For example, the POS system may set the one or more fields of the number of fields included in the order information based on a particular cellular carrier selected by the user at the time of buying the new UE. Accordingly, the one or more fields of number of fields included in the order information may be populated automatically or manually based on the selected cellular carrier.

In some embodiments, the order information with a value set for the one or more fields of the number of fields included in the order information may be used to configure or provision the new UE at the POS system, or before shipping the new UE to the user. Accordingly, when the new UE is unboxed and powered on by the user, the new UE may automatically perform a search for an endpoint to activate the new UE and transfer the set of services from the old UE to the new UE, as described herein. Alternatively, the user may be able to specify (or dynamically trigger) when the new UE searches for the endpoint to activate the new UE with a cellular carrier.

As described herein, in some embodiments, the endpoint may be stored in a memory of the new UE. By way of a non-limiting example, the endpoint stored in the new UE may fetch information for another endpoint based on information received from the new UE, for example, an international mobile equipment identity (IMEI), a mobile equipment identifier (MEID), and so on.

The new UE may send an activation request to the endpoint. Upon receiving the activation request from the new UE, an authentication of the user of the new UE may be performed. The authentication of the user of the new UE may in some cases be performed by causing a display of a page on the new UE, which page may request the user to provide a phone number of the old UE, which the user can transfer to the new UE, in order to transfer a set of services from the old UE to the new UE.

In some cases, the user may be asked to enter information that is known to the user during authentication of the user of the new UE and the old UE. For example, the user may be requested to enter a personal identification number (PIN), a password, a phrase, a unique identifier (for example, a full or a portion of a social security number, a year of a birthdate of the user, or a month and/or a day of a birthdate of the user), a zip code associated with a billing address of the user, and so on.

The new UE may transmit information for authenticating the user of the new UE and the old UE as encrypted data. By way of a non-limiting example, the information for authenticating the user may be encrypted using a configuration file including one or more keys for encryption. The one or more keys may be valid for a limited time duration. The configuration file may be received from the cellular carrier, and may be prestored in the new UE at the POS system and/or before shipping the new UE to the user. In some cases, the configuration file may be received by the UE during a search for the endpoint and/or upon transmitting a request for activation of the new UE.

The new UE may transmit the authentication information as encrypted data, using the one or more keys included in the configuration file, to the set of one or more servers or the endpoint in the cellular carrier domain. Based on successful authentication of the user based on the authentication information received from the new UE, a second authentication may be performed. The second authentication may be part of a two-factor authentication, in which a one-time password (OTP), a PIN, a password, a phrase, an image, and/or a machine-readable code may be sent to the old UE identified by the user of the new UE in the authentication information. The user may enter the OTP, the PIN, the password, the image, and/or the machine-readable code using an input system of the new UE. The input system of the new UE may include, for example, a keyboard, a camera, and so on.

In some embodiments, the UE may encrypt the OTP, the PIN, the password, the image, and/or the machine-readable code for transmitting to the set of one or more servers or the endpoint in the UE manufacturer or cellular carrier domain. Based on successful authentication of the second authentication, the new UE may be registered and activated with the cellular carrier. The new UE may then be provided with configuration information for one or more access point names (APNs) for providing cellular network services to the new UE. In some cases, the order information or tether action settings may be updated with the ICCID and the source ICCID, corresponding to the new UE and the old UE respectively.

In some embodiments, a notification and/or configuration information may be sent to the new UE for transferring a set of services from the old UE to the new UE, for example, via an eSIM subscription transfer. After a successful eSIM subscription transfer, a notification may be sent to the endpoint and/or the set of one or more servers in the UE manufacturer, UE seller, or cellular carrier domain. Upon successful notification, the order information as originally sent may be removed and/or archived.

In some embodiments, if eSIM subscription transfer or the sending of a notification of a status of the eSIM subscription transfer fails, the order information or tether action settings may be updated with new endpoint information for a repeated attempt to transfer the eSIM subscription. By way of a non-limiting example, a UE can be activated according to embodiments described herein at any time. In other words, activation of a UE with a cellular carrier can be performed independently and/or separately from provisioning, configuring, and/or activating other services and/or applications provided from a non-cellular carrier, including but not limited to, a UE manufacture. Accordingly, and for any reason, if a setup URL as described above becomes invalid with the passage of time, and the new UE is not yet activated, a user may contact customer service to request that a new setup URL be configured and/or stored in a memory of the new UE.

In some embodiments, when the user is transferring a set of services from an old UE of the user to a new UE, and the old UE and the new UE are provided cellular carrier services by different cellular carriers, an eSIM can be provisioned with a new set of services based on a service plan selected by the user, instead of transferring the set of services from the old UE to the new UE.

The foregoing and other embodiments, and various alternatives thereof and variations thereto, are discussed below with reference to FIGS. 1-9 for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

FIG. 1 depicts an example flow for selling and activating a UE. As shown in flow 100, a user wanting to upgrade and/or replace an old UE may visit a store. The store may be an online store or a physical brick and mortar store. The user may select a UE ("a device" or "a new UE") at 102. The user may select a cellular carrier, at 104, for receiving a set of services ("subscription services") at the new UE. A pre-authentication 106 of the user may be performed before the sale of the new UE to the user is completed. In some cases, a sales associate at a physical brick and mortar store may perform pre-authentication 106.

The pre-authentication may require the user to provide personal and protected information to the sales associate or to a POS system. In some cases, the personal and protected information of the user may be transmitted to a cellular carrier unencrypted or without proper encryption. In some cases, the personal and protected information may be subject to a middleman attack.

After successful pre-authentication of the user, the purchase of the new UE may be completed (e.g., the user may check out of the store, and the UE may be configured/attached with the cellular carrier selected by the user at 108). After the sale, the user may be authenticated by the cellular carrier at 110, based on authentication information provided by the user. In addition to providing the authentication information, the user may also provide a phone number associated with the old UE. Based on the authentication of the user using the authentication information, the new UE may be activated at 112, and the set of services from the old UE may be transferred to the new UE at 114.

However, as described earlier, the flow 100 for activating the new UE and transferring services from the old UE to the new UE is more time consuming due to the pre-authentication performed at 106, and the additional authentication at 110 (using unencrypted information) may pose a security threat. As described below, activation of the new UE and transfer of the set of services from the old UE to the new UE may be performed without pre-authenticating the user at 106. In addition, the authentication performed at 110 may be performed using encrypted information.

Figure 2:
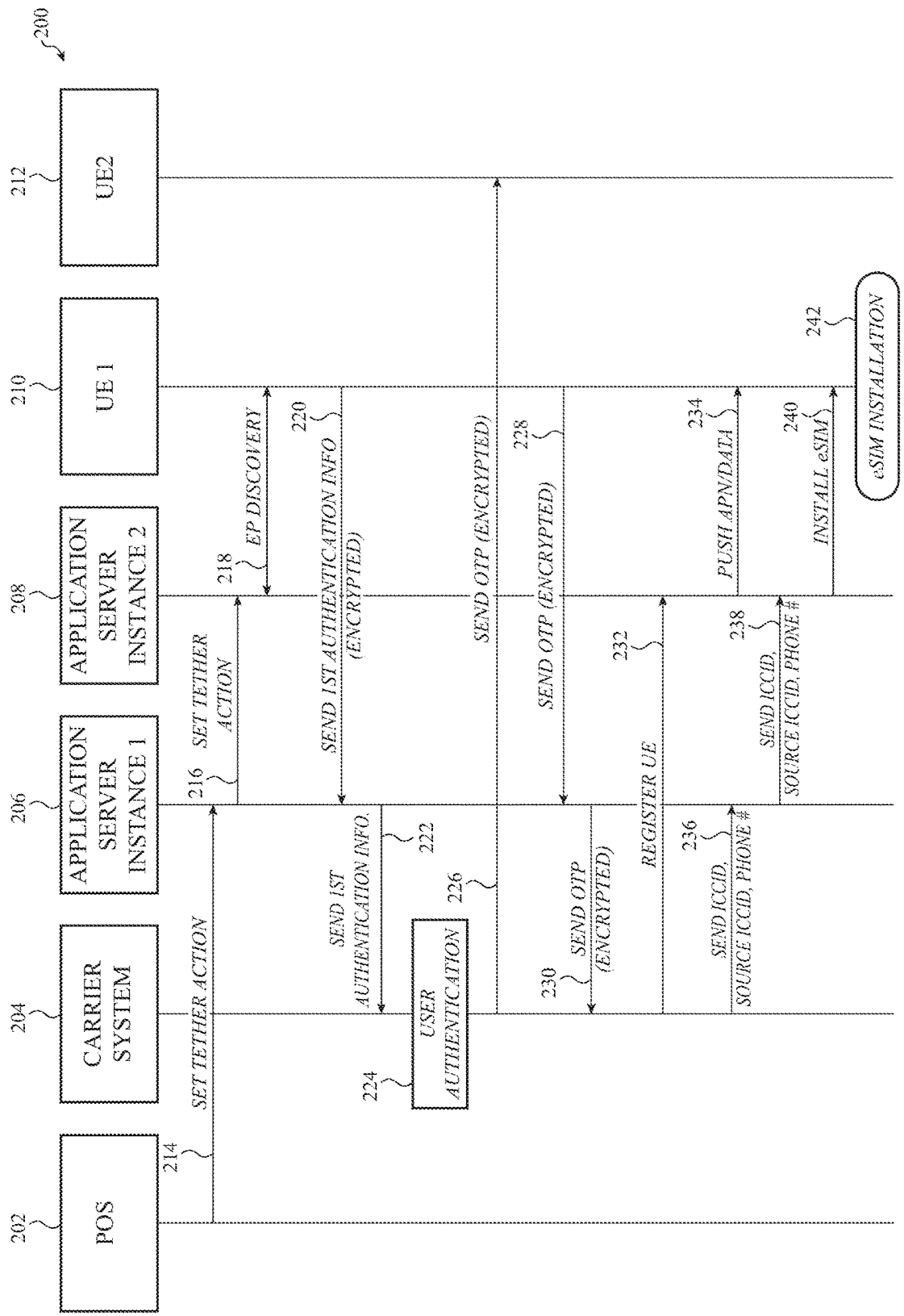
FIG. 2 depicts an example message flow between various elements of a system or a network for selling and activating a UE, including transfer of an embedded subscriber identity module (eSIM) subscription from one UE to another UE.

FIG. 2 depicts an example message flow between various elements of a system or a network for selling and activating a UE, including transfer of an eSIM subscription from one UE to another UE. As shown in FIG. 2, various elements of the system or the network may include a POS system 202, a cellular carrier system 204, an application server instance 1 206, an application server instance 2 208, a UE1 ("a new UE") 210, and a UE2 ("an old UE") 212.

In some embodiments, the cellular carrier system 204 may be an application server in a core network of a cellular carrier. The application server instance 1 206 may be an interface to the carrier system 204, and thus perform one or more functions related to the cellular carrier. By way of a non-limiting example, the application server instance 1 206 may be a micro-service. In some cases, the application server instance 1 206 may be implemented on hardware or a virtual machine. The application server instance 1 206 may in some cases be referred as a carrier services endpoint.

In some embodiments, the application server instance 2 208 may be an interface to the carrier system 204 for performing one or more functions related to a UE or a device, as described herein. The application server instance 2 208 may also be referred as a device services endpoint since a UE may contact the application server instance 2 208 for activation of the UE, and information related to the application server instance 2 208 may be stored in a memory of a UE.

In some embodiments, the application server instance 1 206 and/or the application server instance 2 208 may be part of a cellular carrier domain or the cellular carrier system 204. In some embodiments, the application server instance 1 206 and/or the application server instance 2 208 may be separate from the cellular carrier system 204. For example, the application server instance 1 206 and/or the application server instance 2 208 may be part of a UE manufacturer and/or a UE POS system.

As shown in FIG. 2, when a user visits a store (an online store or a brick and mortar store) to purchase a new UE 210, the POS system 202 may set a tether action 214 with the application server instance 1 206. In some embodiments, the application server instance 1 206 may also propagate to or set a tether action 216 with the application sever instance 2 208.

In the tether action set by the POS system 202, order information may be transmitted from the POS system 202 to the application server instance 1 206. The order information may include a number of fields, such as fields for a phone number, an ICCID of the new UE 210 being sold the user, an ICCID of the old UE 212 of the user ("a source ICCID"), a setup type or a device activation mode, a setup URL, and/or an encryption mode, and so on.

In some embodiments, no value may be set for one or more fields of the number of fields included in the order information, such as the source ICCID. For example, in some cases, the setup type or the device activation mode may be set to SODA, and the encryption mode may be set to true or on to indicate that at least some information transmitted by the new UE 210 may be encrypted and may require functions and/or services associated with encryption and/or decryption of information.

In some embodiments, the setup URL may be an endpoint, which endpoint may be contacted by the new UE 210 upon powering on for activation of the new UE and transferring of an eSIM subscription from the old UE 212 to the new UE 210 of the user. By way of a non-limiting example, the setup URL may include a list of one or more endpoints, such as an endpoint for the application server instance 2 208. The setup URL may be valid for a limited time period. Accordingly, in some cases, an expiration time for the setup URL may be included in the order information. In some cases, the expiration time may be set to, for example, a few hours to a few days.

In some embodiments, the one or more fields of the number of fields included in the order information may be set by the POS system 202, the cellular carrier system 204, the application server instance 1 206, and/or the application server instance 2 208. For example, the POS system 202 may set the one or more fields of the number of fields included in the order information based on a particular cellular carrier selected by the user at the time of buying the new UE 210. Accordingly, the one or more fields of number of fields included in the order information may be populated automatically or manually based on the selected cellular carrier.

In some embodiments, the order information with a value set for the one or more fields of the number of fields included in the order information may be used to configure or provision the new UE 210 at the POS system, or before shipping the new UE 210 to the user. Accordingly, when the new UE 210 is unboxed and powered on by the user, the new UE 210 may automatically (or at a time dictated by the user) perform a search for an endpoint and contact the endpoint (e.g., perform "an EP discovery") at 218 to activate the new UE 210 and transfer the set of services from the old UE 212 to the new UE 210, as described herein.

As part of the EP discovery, the new UE 210 may send an activation request to the endpoint, which in some cases may be an endpoint at the application server instance 2 208. As a result of the activation request from the new UE 210, the application server instance 2 208 may also send a notification or a message indicating the new UE 210 has sent an activation request. The application server instance 1 206, which as described herein may be an interface to the cellular carrier system 204, may initiate an authentication process 220 to authenticate the user of the new UE 210.

In some embodiments, the authentication of the user of the new UE 210 may be performed by causing a display of a page on the new UE 210, which page requests the user to provide information identifying another UE (e.g., a phone number of an old UE 212 that the user would like to transfer to the new UE), in order to transfer a set of services from the old UE 212 to the new UE 210.

In some embodiments, the user may also be required to enter information that is personal or private and known to the user alone (e.g., authentication information, for authenticating the user). For example, the user may be requested to enter a PIN, a password, a phrase, a unique identifier (for example, a full or a portion of a social security number, a year of a birthdate of the user, or a month and/or a day of a birthdate of the user), a zip code associated with a billing address of the user, and so on.

The new UE 210 may send information for authenticating the user of the new UE 210 and the old UE 212 as encrypted information. By way of a non-limiting example, the information for authenticating the user may be encrypted using a configuration file that includes one or more keys for encryption. The configuration file may be received from the cellular carrier system 204, and may be prestored in the new UE 210 at the POS system 202 and/or before shipping the new UE 210 to the user. In some cases, the configuration file may be received by the new UE 210 during a search for the endpoint and/or upon sending a request for activation 218 of the new UE The new UE 210 may send the authentication information as encrypted information, at 220, using the one or more keys included in the configuration file to the application server instance 1 206. The application server instance 1 206 may forward the received encrypted authentication information from the new UE 210 to the cellular carrier system 204 at 222. The cellular carrier system may authenticate the user of the new UE 210 at 224.

In some embodiments, based on successful authentication of the user of the new UE 210, based on the authentication information received from the new UE 210, a second authentication may be performed. The second authentication may be part of a two-factor authentication in which verification information (e.g., an OTP, a PIN, a password, a phrase, an image, and/or a machine-readable code) may be sent, at 226, to the old UE 212 (i.e., the UE identified by the user of the new UE 210 at 220). The user may enter the OTP, the PIN, the password, the image, and/or the machine-readable code using an input system of the new UE, and the OTP or other information may be sent as encrypted information 228 to the application server instance 1 206, as described earlier. The input system of the new UE may include, for example, a keyboard, a camera, and so on. The second authentication information (e.g., the OTP, the PIN, the password, the image, and/or the machine-readable code) received as encrypted information at the application server instance 1 206 may then be forwarded, at 230, to the cellular carrier system 204 for validation.

Based on successful validation of the verification information, the cellular carrier system 204 may send a register UE event 232 to the application server instance 2 208, which as described herein may provide functions specific to the device. Upon receiving the register UE event 232, the application server instance 2 208 may push one or more access point names (APNs) 234 to the new UE 210 for configuring and activating the new UE 210. The cellular carrier system 204 may also send an ICCID, a source ICCID, and a phone number to the application server instance 1 206 and/or the application server instance 2 208, at 236. In some cases, the application server instance 1 206 may forward the received ICCID, source ICCID, and phone number to the application server instance 2 208 at 238.

In some embodiments, upon receiving the ICCID, source ICCID, and phone number at the application server instance 2 208, the application server instance 2 208 may send a notification to install eSIM 240 on the new UE 210 and may initiate a transfer of an eSIM subscription from the old UE 212 to the new UE 210. The new UE 210 may then perform an eSIM installation at 242, to activate and transfer the set of services from the old UE 212 to the new UE 210.

In some embodiments, tether action settings may be updated upon successful authentication of the user using a two-factor authentication. For example, tether action settings may be updated for an ICCID, a source ICCID, a phone number, and so on, upon successful authentication of the user using the two-factor authentication.

Figure 3:
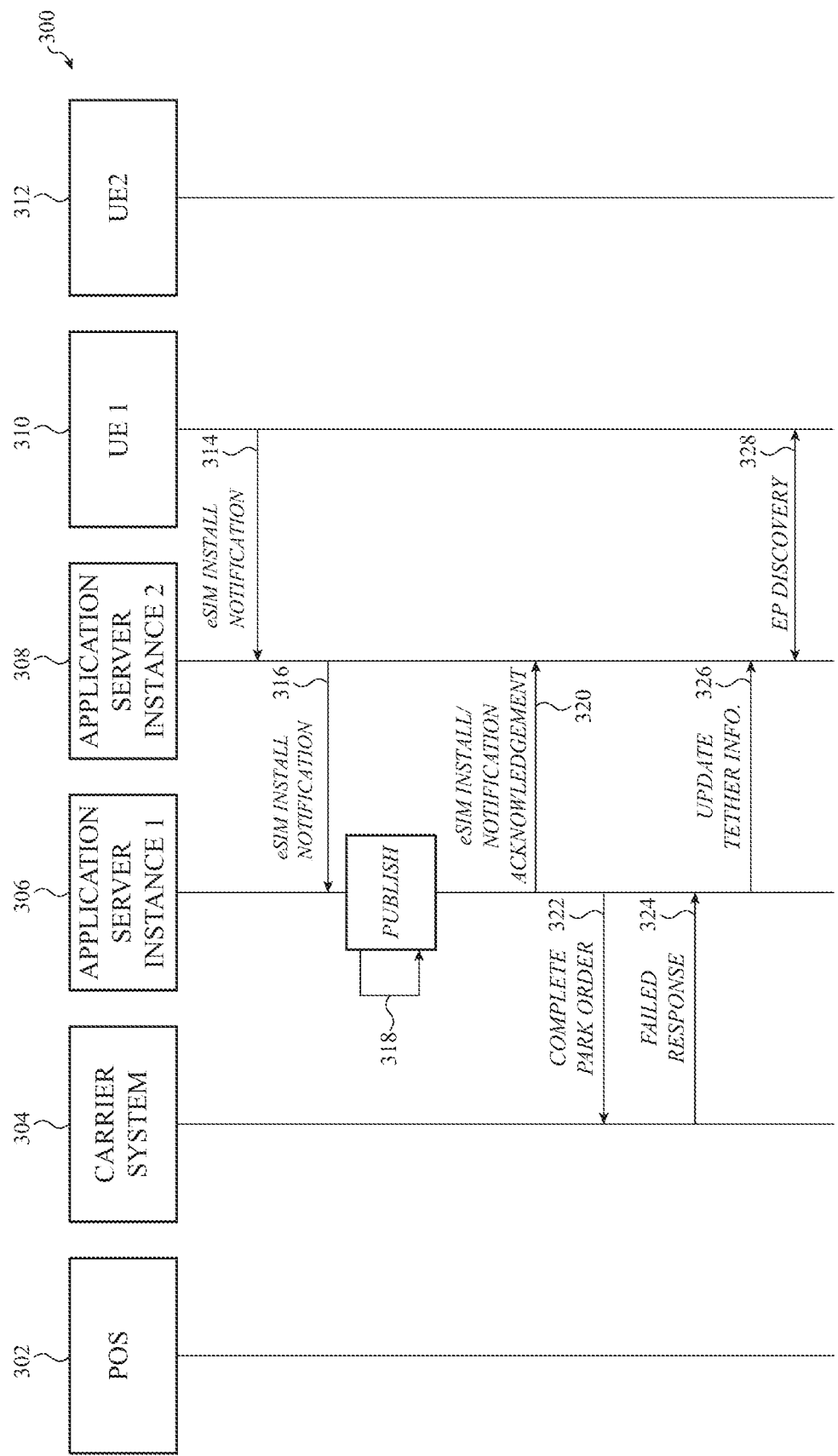
FIG. 3 depicts an example message flow between various elements of a system or a network for transfer of an eSIM from one UE to another UE.

FIG. 3 depicts an example message flow between various elements of a system or a network for transferring an eSIM subscription from one UE to another UE. As shown in FIG. 3, various elements of the system or the network may include a POS system 302, a cellular carrier system 304, an application server instance 1 306, an application server instance 2 308, a UE1 ("a new UE") 310, and a UE2 ("an old UE") 312. The POS system 302 may be same as the POS system 202, the cellular carrier system 304 may be same as the cellular carrier system 204. The application server instance 1 306 and the application server instance 2 308 may be same as the application server instance 1 206 and the application server instance 2 208, respectively. The new UE 310 and the old UE 312 may be same as the new UE 210 and the old UE 212, respectively.

In some embodiments, after eSIM installation 242, an eSIM installation notification 314 may be sent from the new UE 310 to the application server instance 2 308. The application server instance 2 308 may forward the eSIM installation notification 316 to the application server instance 1 306. The application server instance 1 306 may publish 318 the new UE with the phone number transferred from the old UE 312. The application server instance 1 306 may send an acknowledgement of the eSIM installation notification 320 to the application server instance 2 308.

In some embodiments, the application server instance 1 306 may also complete a parked order 322 by sending a request, a message, an event, or a notification to the cellular carrier system 304, to inform that the new UE has been activated and the set of services from the old UE 312 are transferred to the new UE 310. In cases, when the completing the parked order fails at the cellular carrier system 304 for any reason, the cellular carrier system 304 may send a notification 324 (e.g., a notification of a status of the eSIM subscription transfer) indicating the same to the application server instance 1 306. The application server instance 1 306 may then update tether action settings 326 to the application server instance 2 308. By way of a non-limiting example, an endpoint may be updated in the tether action settings. The updated endpoint may be different from the endpoint to which an activation request 218 is sent by the new UE 210 or 310. The application server instance 2 308 may then update 328 the new UE1 310 with the updated endpoint. So that the new UE 310 may reinitiate the activation procedure.

In some embodiments, a message, a request, an event and/or a notification regarding completing a financial transaction (e.g., for receiving commission, and so on) in accordance with an agreement between a UE manufacturer, a POS system, and/or a cellular carrier may be sent from a POS system, a UE manufacturer, and/or a cellular carrier to the UE manufacturer, the cellular carrier, and/or the POS system. In some cases, the message, the request, the event, and/or the notification regarding completing the financial transaction may be performed after the application server instance 1 306 sends a message, a request, an event and/or a notification to complete a parked order 322 to the cellular carrier system 304, and upon receiving a response from the cellular carrier system 304 indicating successful termination or fulfillment of a parked order.

Figure 4:
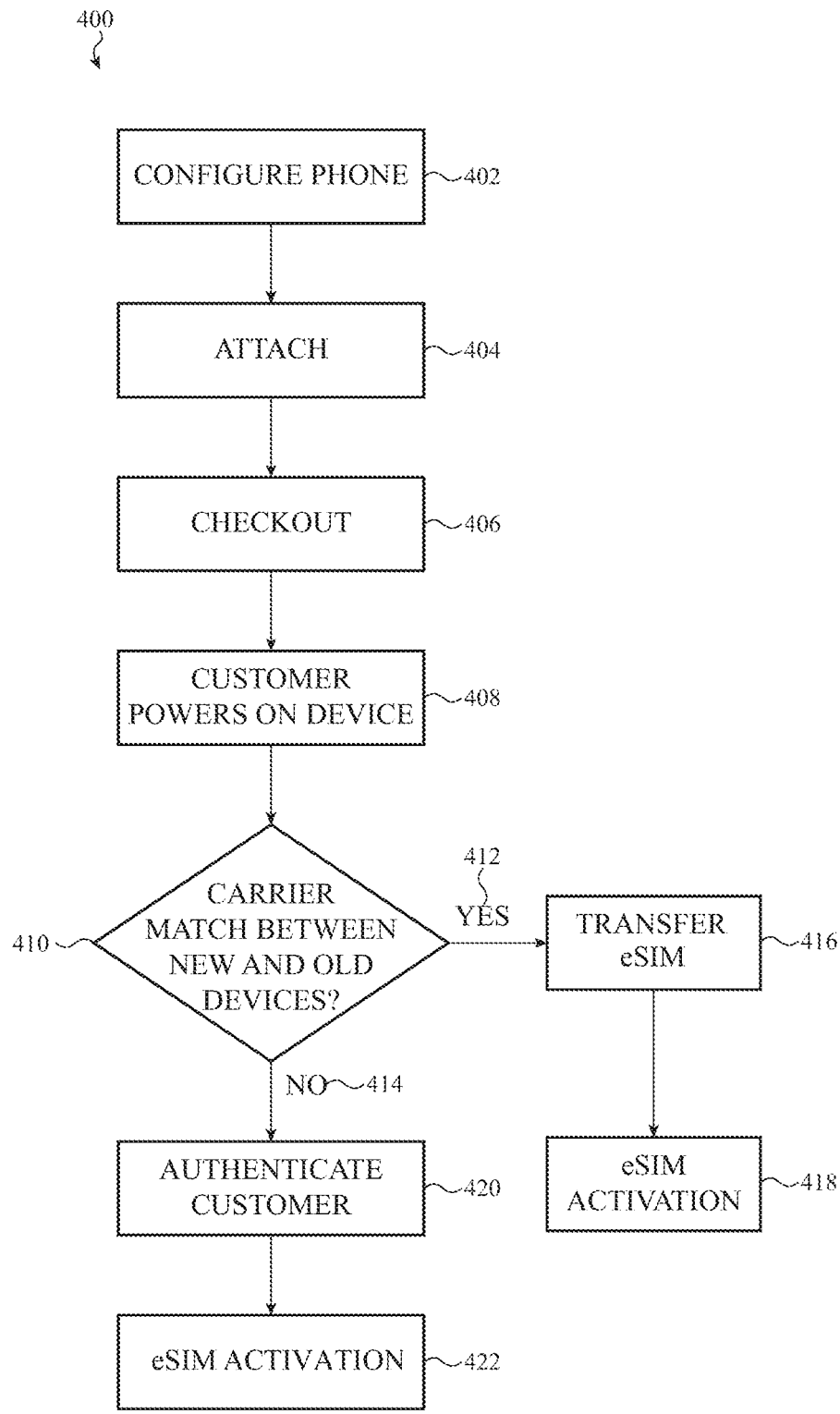
FIG. 4 depicts an example flow chart for activating an eSIM on a UE.

FIG. 4 depicts an example flow chart for activating an eSIM on a UE. As shown in a flowchart 400, a user may purchase a new UE (e.g., a phone) 402. The new UE 402 may be purchased without a pre-authentication of a user of the new UE, as described herein in accordance with some embodiments, and may be attached (configured) 404 for activation of the new UE and/or transferring of a set of services from an old UE to the new UE. The user may checkout the new UE 408. When the new UE is powered on 408, as described herein with reference to FIG. 2 and FIG. 3, the new UE may be activated with a cellular carrier.

In some embodiments, when the user has provided a phone number of the old UE for transferring the set of services from the old UE to the new UE, the cellular carrier may compare 410 a cellular carrier associated with the old UE and a cellular carrier associated with the new UE. Upon determining the carrier associated with the old UE is same as the cellular carrier associated with the new UE 412, the cellular carrier may initiate eSIM transfer 416 for activating an eSIM 418 on the new UE. However, upon determining that the carrier associated with the old UE is different from the cellular carrier associated with the new UE 414, the user may be authenticated 420 and an eSIM may be activated 422.

Figure 5:
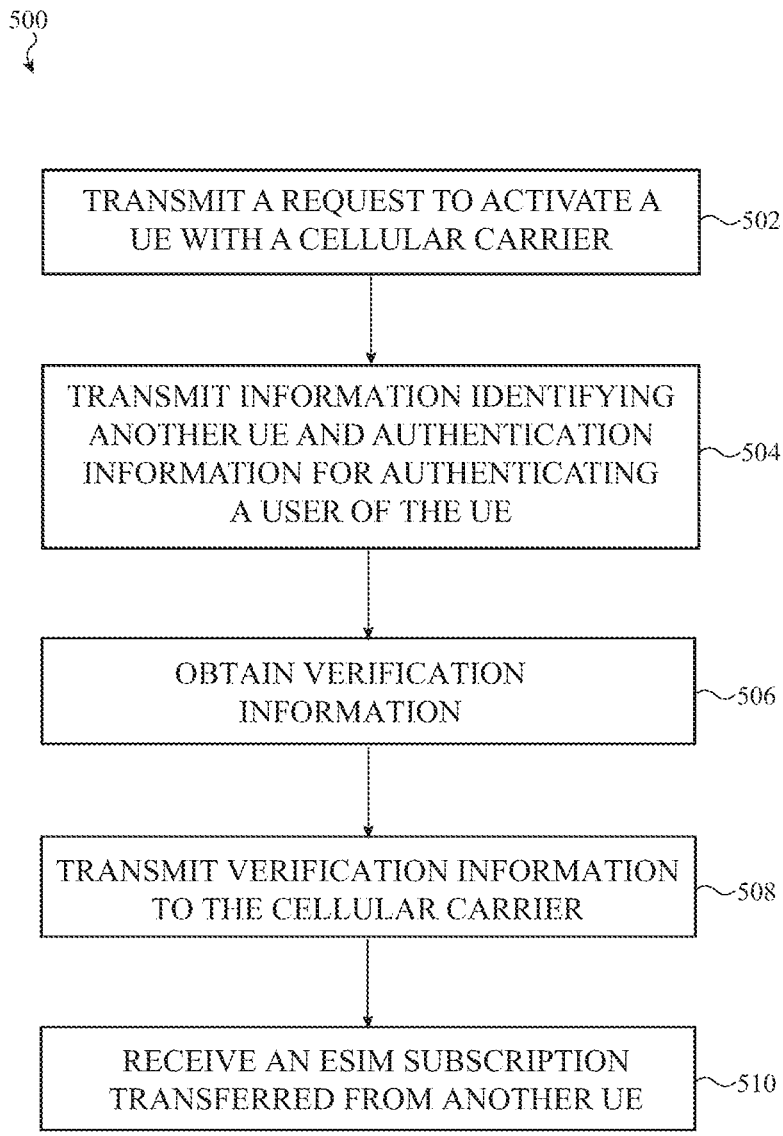
FIG. 5 depicts an example method that may be performed at a UE for activating and/or transferring an eSIM subscription to the UE.

FIG. 5 depicts an example method 500 that may be performed at a UE for activating and/or transferring an eSIM subscription to the UE. As shown in the method 500, when a user of a new UE powers on the new UE, the new UE may perform an endpoint discovery and transmit, at 502, a request to activate the new UE with a cellular carrier. The cellular carrier may be a cellular carrier that the user selected while purchasing the new UE.

As described herein, and in accordance with some embodiments, the user may not have been pre-authenticated with the cellular carrier when purchasing the new UE. At 504, the user may be authenticated by the cellular carrier, as described in more detail with reference to FIG. 2. In some cases, the UE may transmit, to the cellular carrier and in response to receiving an authentication request for authenticating the user, authentication information for authenticating the user. The authentication information may include, for example, a PIN, a password, a phrase, a unique identifier (for example, a full or a portion of a social security number, a year of a birthdate of the user, a month and/or a day of a birthdate of the user), a zip code associated with a billing address of the user, and so on. The UE may also transmit, along with the authentication information, information identifying another UE (e.g., a phone number associated with an old UE of the user). The authentication information and the information identify the other UE may be transmitted to the cellular carrier as encrypted data, as described herein.

In some embodiments, the cellular carrier may perform a two-factor authentication. For example, the cellular carrier may send verification information (e.g., an OTP, a PIN, a password, a phrase, an image, and/or a machine-readable code) to the old UE. Since the user is also a user of the old UE, it may be assumed that the old UE is in possession of the user. At 506, the new UE may obtain the verification information by, for example, prompting the user (e.g., via a display) to provide (e.g., enter or take a photo of) the verification information via an input system of the new UE, and the user may then enter the verification information (the OTP, the PIN, the password, the phrase, the image, and/or the machine-readable code (e.g., a bar code, a quick response (QR) code, and so on)) received at the old UE. At 508, the verification information may be transmitted to the cellular carrier for completing the two-factor authentication, as described, for example, with reference to FIG. 2. For example, as shown in FIG. 2 as 230, the verification information may be transmitted to the cellular carrier for validation of the verification information.

In response to validation of the verification information by the cellular carrier, and at 510, the new UE may receive an eSIM subscription transferred from the old UE. Successful activation of the eSIM and transfer of the eSIM subscription to the new UE may result in the set of services provided on the old UE being transferred to the new UE.

Figure 6:
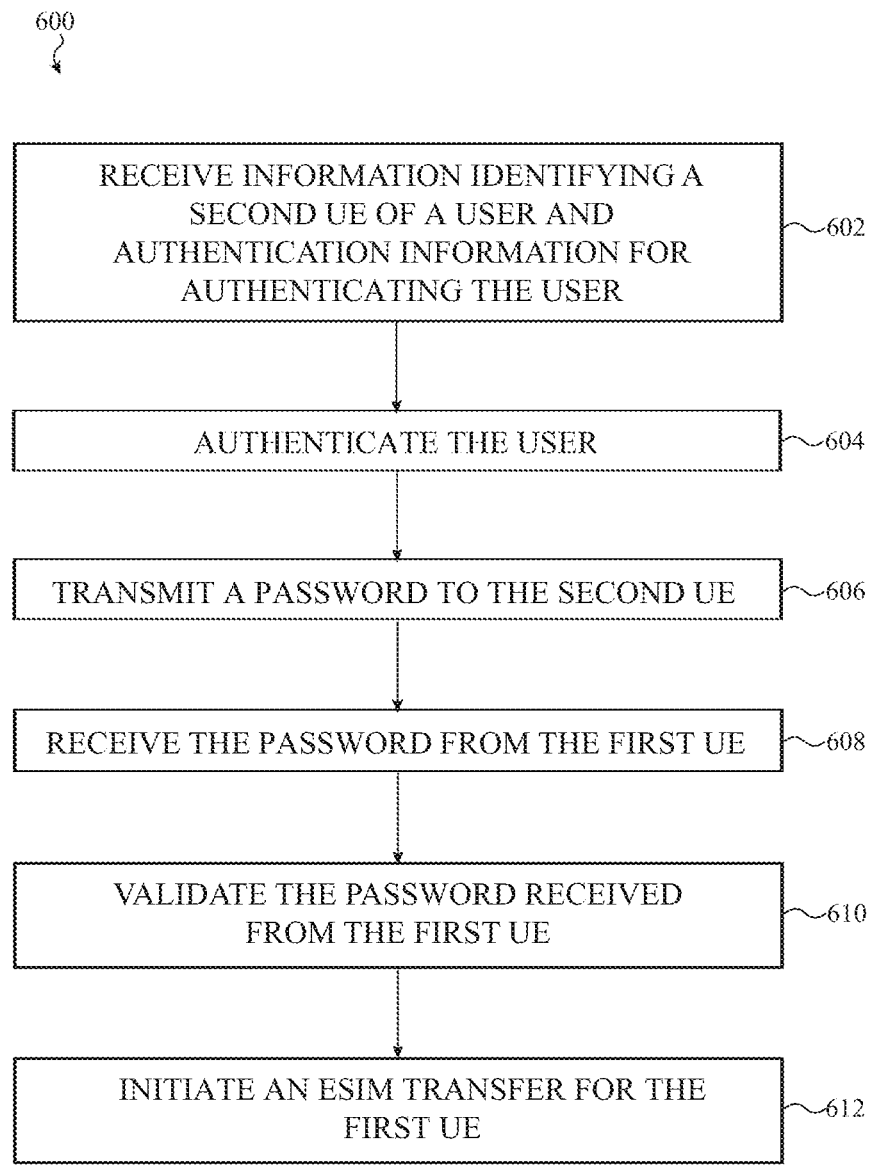
FIG. 6 depicts an example method that may be performed at a set of one or more servers in a cellular carrier domain to transfer an eSIM subscription from an old UE to a new UE.

FIG. 6 depicts an example method 600 that may be performed at a set of one or more servers in a cellular carrier domain to transfer an eSIM subscription from an old UE to a new UE, as described herein in accordance with some embodiments. As shown in the method 600, at 602, a set of one or more servers, for example, located in a cellular carrier domain, may receive authentication information and information identifying another UE (e.g., a phone number of an old UE of the user) from a new UE which is to be activated on a cellular carrier. The authentication information and the information identifying the other UE may be received as encrypted data, which may be decrypted, and the user may be authenticated at 604, as described herein.

In some embodiments, the cellular carrier may perform a two-factor authentication (or stage 2 authentication). As described above with reference to FIG. 2, and at 606, the set of one or more servers may transmit verification information (e.g., an OTP, a PIN, a password, a phrase, an image, and/or a machine-readable code) to the UE for which identification information was received at 602. At 608, the verification information may be received from the new UE. In some cases, the verification information may be received as encrypted data. At 610, the verification information may be decrypted and validated and, at 616, a transfer of an eSIM subscription, from the old UE to the new UE, may be initiated.

The embodiments described herein may reduce the overall time to activate and transfer a set of services from an old UE to a new UE, by eliminating a step of pre-authenticating a user with a cellular carrier during purchase of the new UE, and by providing a mechanism for secure authentication of the user of the new UE prior to an eSIM subscription transfer.

Figure 7:
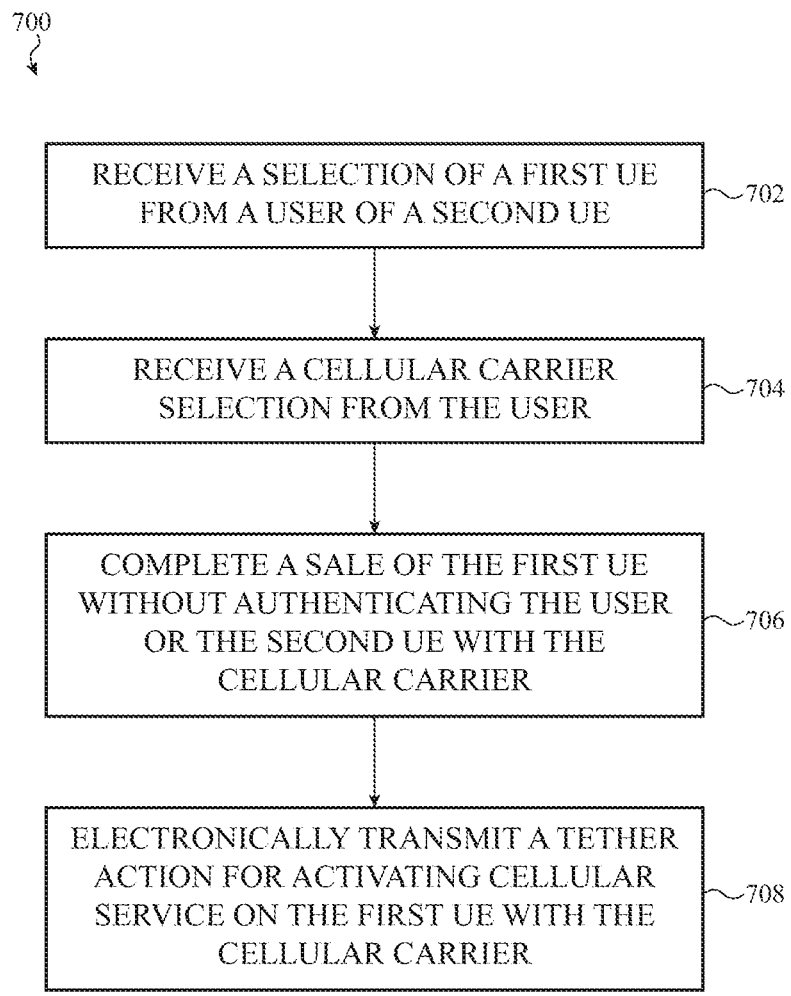
FIG. 7 depicts an example method for selling a UE.

FIG. 7 depicts an example method 700 of selling a UE. As shown in the method 700, and at 702, a POS system may receive a selection of a new UE from a user of an old UE. At 704, the POS system may receive a selection of a cellular carrier from the user. As described herein, no pre-authentication of the user may be required to complete the purchase of the new UE. The POS system, at 706, may thus complete the sale of the new UE, to the user, without authenticating the user or the old UE with the cellular carrier. At 708, the POS system may electronically transmit a tether action to a set of one more servers, as described above, for activating cellular service on the new UE with the cellular carrier. The tether action may include information pertaining to the new UE but not the old UE.

As described herein, and in accordance with some embodiments, no information is required about the old UE to sell the new UE to the user of the old UE.

Embodiments contemplated herein include an apparatus having means to perform one or more elements of the method 500, 600, or 700. In the context of method 500, 600, or 700, this apparatus may be, for example, an apparatus of a UE (such as a wireless device 902 that is a UE, as described herein), an apparatus of an access point or an application server (such as a network device 918 that is an access point or an application server, as described herein).

Embodiments contemplated herein include one or more non-transitory computer-readable media storing instructions to cause an electronic device, upon execution of the instructions by one or more processors of the electronic device, to perform one or more elements of the method 500, 600, or 700. In the context of method 500, 600, or 700, this non-transitory computer-readable media may be, for example, a memory of a UE (such as a memory 906 of a wireless device 902 that is a UE, as described herein), or a memory of an access point or an application server (such as a memory 924 of a network device 1018 that is an access point or an application server, as described herein).

Embodiments contemplated herein include an apparatus having logic, modules, or circuitry to perform one or more elements of the method 500, 600, or 700. In the context of method 500, 600, or 700, this apparatus may be, for example, an apparatus of a UE (such as a wireless device 902 that is a UE, as described herein), or an apparatus of an access point or an application server (such as a network device 918 that is an access point or an application server, as described herein).

Embodiments contemplated herein include an apparatus having one or more processors and one or more computer-readable media, using or storing instructions that, when executed by the one or more processors, cause the one or more processors to perform one or more elements of the method 500, 600, or 700. In the context of method 500, 600, or 700, this apparatus may be, for example, an apparatus of a UE (such as a wireless device 902 that is a UE, as described herein), or an apparatus of an access point or an application server (such as a network device 918 that is an access point or an application server, as described herein).

Embodiments contemplated herein include a signal as described in or related to one or more elements of the method 500, 600, or 700.

Embodiments contemplated herein include a computer program or computer program product having instructions, wherein execution of the program by a processor causes the processor to carry out one or more elements of the message flows of FIGS. 2-3, and/or method steps of FIGS. 5-7. In the context of message flows of FIGS. 2-3, the processor may be a processor of a UE (such as a processor(s) 904 of a wireless device 902 that is a UE, as described herein), and the instructions may be, for example, located in the processor and/or on a memory of the UE (such as a memory 906 of a wireless device 902 that is a UE, as described herein); or the processor may be a processor of a server, an access point, or an application server in a cellular carrier domain) (such as a processor(s) 922 of a network device 920 that is a server, an application server, or an access point, as described herein), and the instructions may be, for example, located in the processor and/or on a memory of the server (such as a memory 924 of a network device 920 that is a server, an application server, or an access point, as described herein).

Figure 8:
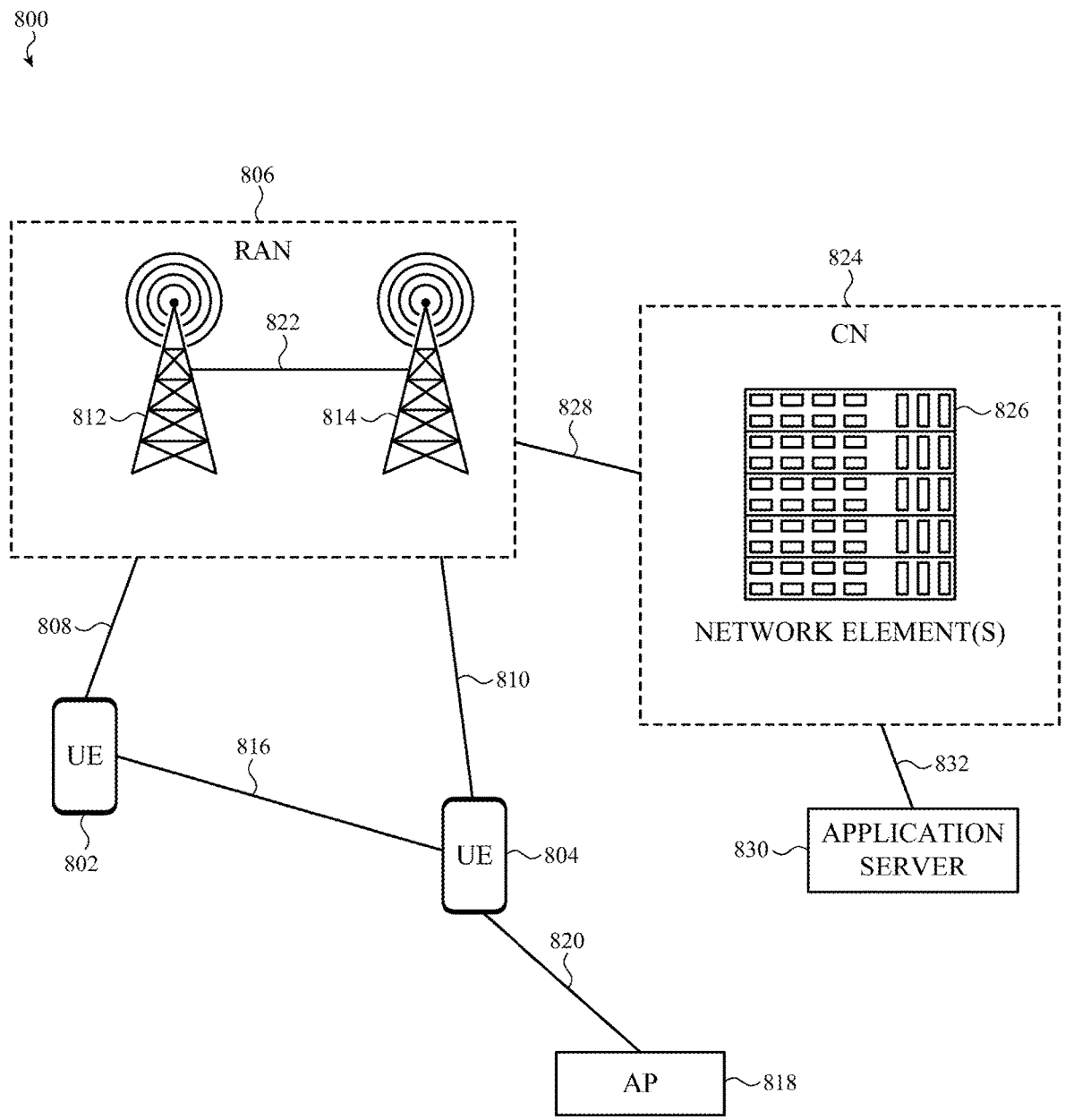
FIG. 8 depicts an example architecture of a wireless communication system of a cellular carrier domain, according to embodiments disclosed herein.

FIG. 8 depicts an example architecture of a wireless communication system of a cellular carrier domain, according to embodiments disclosed herein. The following description is provided for an example wireless communication system 800 that operates in conjunction with the LTE system standards and/or 5G or NR system standards, and/or future standards for 6G, and so on, as provided by 3GPP technical specifications.

As shown by FIG. 8, the wireless communication system 800 includes a UE 802 and a UE 804 (although any number of UEs may be used). In this example, the UE 802 and the UE 804 are illustrated as smartphones (e.g., handheld touchscreen mobile computing devices connectable to one or more cellular networks) but may also comprise any mobile or non-mobile computing device configured for wireless communication. The UE 802 may be a new UE 210 or 310, and the UE 804 may be an old UE 212 or 312, described in the present disclosure.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling and may be consistent with one or more radio access technologies (RATs) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
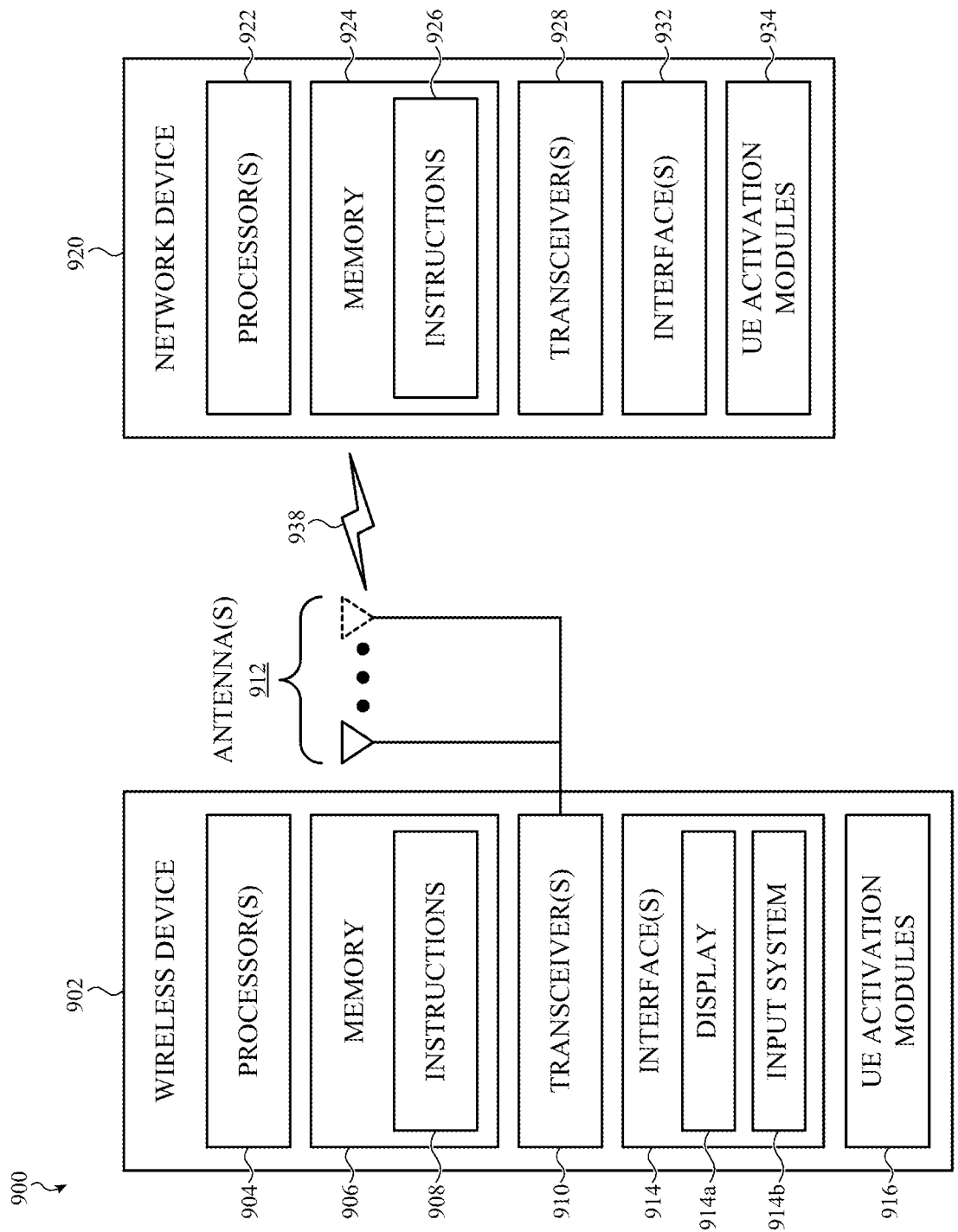
FIG. 9 depicts a system for performing signaling between a UE and a network device, according to embodiments disclosed herein.

FIG. 9 illustrates a system 900 for performing signaling 938 between a wireless device 902 and a network device 920, according to embodiments disclosed herein. The system 900 may be a portion of a wireless communications system as herein described. The wireless device 902 may be, for example, a UE of a wireless communication system. The network device 920 may be, for example, an application server connected to a wireless communication system via wired or wireless communication links.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 938) to and/or from the wireless device 902 with other devices (e.g., the network device 920) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments, the wireless device 902 (e.g., a UE) may communicate with the network device 920 (e.g., an application server) via an access point (not shown, but shown in FIG. 8). The wireless device 902 may communicate with the access point via the antennas 912, and the access point may communicate with the network device 920 via a wired or wireless connection.

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. For example, a display 914a and an input system 914b of the interface(s) 914 are shown in FIG. 9. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a UE activation module 916. The UE activation module 916 may be implemented via hardware, software, or combinations thereof. For example, the UE activation module 916 may be implemented as a processor, circuit, and/or instructions 908 stored in the memory 906 and executed by the processor(s) 904. In some examples, the UE activation module 916 may be integrated within the processor(s) 904 and/or the transceiver(s) 910. For example, the UE activation module 916 may be implemented by a combination of software components (e.g., executed by a DSP or a general processor) and hardware components (e.g., logic gates and circuitry) within the processor(s) 904 or the transceiver(s) 910.

The UE activation module 916 may be configured to, for example, receive, determine, and/or apply UE activation related message processing and/or perform related procedures, as described with reference to FIGS. 2-6.

The network device 920 may include one or more processor(s) 922. The processor(s) 922 may execute instructions such that various operations of the network device 920 are performed, as described herein. The processor(s) 922 may include one or more baseband processors implemented using, for example, a CPU, a DSP, an ASIC, a controller, an FPGA device, another hardware device, a firmware device, or any combination thereof configured to perform the operations described herein.

The network device 920 may include a memory 924. The memory 924 may be a non-transitory computer-readable storage medium that stores instructions 926 (which may include, for example, the instructions being executed by the processor(s) 922). The instructions 926 may also be referred to as program code or a computer program. The memory 924 may also store data used by, and results computed by, the processor(s) 922.

The network device 920 may include one or more transceiver(s) 928 that may include RF transmitter and/or receiver circuitry that use the antenna(s) 930 of the network device 920 to facilitate signaling (e.g., the signaling 938) to and/or from the network device 920 with other devices (e.g., the wireless device 902) according to corresponding RATs. In certain embodiments, the signaling 938 may occur via a wired or a wireless network.

The network device 920 may include one or more antenna(s) 930 (e.g., one, two, four, or more). In embodiments having multiple antenna(s) 930, the network device 920 may perform MIMO, digital beamforming, analog beamforming, beam steering, etc., as has been described.

The network device 920 may include one or more interface(s) 932. The interface(s) 932 may be used to provide input to or output from the network device 920. For example, a network device 920 that is a base station may include interface(s) 932 made up of transmitters, receivers, and other circuitry (e.g., other than the transceiver(s) 928/antenna(s) 930 already described) that enables the base station to communicate with other equipment in a core network, and/or that enables the base station to communicate with external networks, computers, databases, and the like for purposes of operations, administration, and maintenance of the base station or other equipment operably connected thereto.

The network device 920 may include a UE activation module 934. The UE activation module 934 may be implemented via hardware, software, or combinations thereof. For example, the UE activation module 934 may be implemented as a processor, circuit, and/or instructions 926 stored in the memory 924 and executed by the processor(s) 922. In some examples, the UE activation module 934 may be integrated within the processor(s) 922 and/or the transceiver(s) 928. For example, the UE activation module 934 may be implemented by a combination of software components (e.g., executed by a DSP or a general processor) and hardware components (e.g., logic gates and circuitry) within the processor(s) 922 or the transceiver(s) 928.

The UE activation module 934 may be configured to, for example, receive, determine, and/or apply UE activation related message processing and/or perform related procedures, as described with reference to FIGS. 2-6.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A user equipment (UE), comprising:
    a transceiver; and
    a processor, configured to,
        transmit, using the transceiver of the UE, a request to activate the UE with a cellular carrier;
        in response to receiving an authentication request for authenticating a user of the UE, transmit, using the transceiver of the UE and to the cellular carrier, information identifying another UE and authentication information for authenticating the user;
        obtain verification information transmitted to the other UE;
        transmit, using the transceiver of the UE and to the cellular carrier, the verification information; and
        in response to validation of the verification information by the cellular carrier, receive an embedded subscriber identity module (eSIM) subscription transferred from the other UE.

2. The UE of claim 1, wherein the processor is further configured to:
    transmit, using the transceiver of the UE and to the cellular carrier, a notification of a status of the eSIM subscription transfer.

3. The UE of claim 1, wherein:
    at least one of the request to activate the UE, the information identifying the other UE, the authentication information, or the verification information is transmitted to an endpoint configured in a memory of the UE, the endpoint configured to provide activation service to the UE, and
    the verification information is obtained by prompting the user, using a display of the UE, to provide the verification information via an input system of the UE.

4. The UE of claim 1, wherein the processor is further configured to:
    encrypt, before transmitting to the cellular carrier, at least one of the authentication information for authenticating the user, or the verification information.

5. The UE of claim 4, wherein the at least one of the authentication information or the verification information is encrypted based on a configuration file including one or more keys for encrypting the authentication information or the verification information.

6. The UE of claim 5, wherein the one or more keys for encrypting the authentication information or the password are valid for a limited time duration.

7. The UE of claim 1, wherein the verification information includes one or more of: a one-time password (OTP), a personal identification number (PIN), a password, a phrase, an image, or machine-readable code.

8. A method of a user equipment (UE), comprising:
    transmitting, using a transceiver of the UE, a request to activate the UE with a cellular carrier;
    in response to receiving an authentication request for authenticating a user of the UE, transmitting, using the transceiver of the UE and to the cellular carrier, information identifying another UE and authentication information for authenticating the user;
    obtaining verification information transmitted to the other UE;
    transmitting, using the transceiver of the UE and to the cellular carrier, the verification information; and
    in response to validation of the verification information by the cellular carrier, receiving an embedded subscriber identity module (eSIM) subscription transferred from the other UE.

9. The method of claim 8, wherein further comprising:
    transmitting, using the transceiver of the UE and to the cellular carrier, a notification of a status of the eSIM subscription transfer.

10. The method of claim 8, wherein:
    at least one of the request to activate the UE, the information identifying the other UE, the authentication information, or the verification information is transmitted to an endpoint configured in a memory of the UE, the endpoint configured to provide activation service to the UE, and obtaining the verification information comprises prompting the user, using a display of the UE, to provide the verification information via an input system of the UE.

11. The method of claim 8, wherein further comprising:
encrypting, before transmitting to the cellular carrier, at least one of the authentication information for authenticating the user, or the verification information.

12. The method of claim 11, wherein the at least one of the authentication information or the verification information is encrypted based on a configuration file including one or more keys for encrypting the authentication information or the verification information.

13. The method of claim 12, wherein the one or more keys for encrypting the authentication information or the password are valid for a limited time duration.

14. The method of claim 8, wherein the verification information includes one or more of: a one-time password (OTP), a personal identification number (PIN), a password, a phrase, an image, or machine-readable code.

15. A non-transitory computer-readable medium storing program code for wireless communication, the program code executable by a processor to:
transmit, using a transceiver of a user equipment (UE), a request to activate the UE with a cellular carrier;
in response to receiving an authentication request for authenticating a user of the UE, transmitting, use the transceiver of the UE and to the cellular carrier, information identifying another UE and authentication information for authenticating the user;
obtain verification information transmitted to the other UE;
transmit, using the transceiver of the UE and to the cellular carrier, the verification information; and
in response to validation of the verification information by the cellular carrier, receive an embedded subscriber identity module (eSIM) subscription transferred from the other UE.

16. The non-transitory computer-readable medium of claim 15, wherein the program code is further executable by the processor to:
transmit, using the transceiver of the UE and to the cellular carrier, a notification of a status of the eSIM subscription transfer.

17. The non-transitory computer-readable medium of claim 15, wherein:
at least one of the request to activate the UE, the information identifying the other UE, the authentication information, or the verification information is transmitted to an endpoint configured in a memory of the UE, the endpoint configured to provide activation service to the UE, and
the verification information is obtained by prompting the user, using a display of the UE, to provide the verification information via an input system of the UE.

18. The non-transitory computer-readable medium of claim 15, wherein the program code is further executable by the processor to:
encrypt, before transmitting to the cellular carrier, at least one of the authentication information for authenticating the user, or the verification information.

19. The non-transitory computer-readable medium of claim 18, wherein the at least one of the authentication information or the verification information is encrypted based on a configuration file including one or more keys for encrypting the authentication information or the verification information.

20. The non-transitory computer-readable medium of claim 15, wherein the verification information includes one or more of: a one-time password (OTP), a personal identification number (PIN), a password, a phrase, an image, or machine-readable code.

* * * * *